(12) United States Patent
Bowser et al.

(10) Patent No.: US 6,460,885 B1
(45) Date of Patent: Oct. 8, 2002

(54) AIR BAG MODULE AND METHOD OF FOLDING AN AIR BAG

(75) Inventors: Robert E. Bowser, Brighton; Janice L Woolley, Goodrich, both of MI (US)

(73) Assignee: General Motors Corporation, Detroit, MI (US)

(*) Notice: Subject to any disclaimer, the term of this patent is extended or adjusted under 35 U.S.C. 154(b) by 0 days.

(21) Appl. No.: 10/044,124

(22) Filed: Jan. 10, 2002

(51) Int. Cl.[7] .................................................. B60R 21/16
(52) U.S. Cl. ....................................................... 280/743.1
(58) Field of Search ............................... 280/743.1, 731, 280/732

(56) References Cited

U.S. PATENT DOCUMENTS

| | | | |
|---|---|---|---|
| 4,173,356 A | | 11/1979 | Ross ........................... 280/743 |
| 5,087,067 A | * | 2/1992 | Seki et al. ................... 280/732 |
| 5,360,231 A | * | 11/1994 | Adams ...................... 280/728.2 |
| 5,398,968 A | * | 3/1995 | Emambakhsh et al. .. 280/743.1 |
| 5,531,477 A | | 7/1996 | Madrigal et al. ......... 280/743.1 |
| 5,647,608 A | * | 7/1997 | Damman et al. ............ 280/732 |
| 5,746,447 A | * | 5/1998 | Dyer et al. ............... 280/743.1 |
| 5,803,483 A | | 9/1998 | Lunt ........................ 280/728.1 |
| 5,884,939 A | * | 3/1999 | Yamaji et al. ........... 280/743.1 |
| 5,944,346 A | | 8/1999 | Lachat et al. ............. 280/743.1 |
| 6,171,228 B1 | | 1/2001 | Marotzke et al. ............ 493/405 |

* cited by examiner

*Primary Examiner*—Eric Culbreth
(74) *Attorney, Agent, or Firm*—Laura C. Hargitt

(57) ABSTRACT

An air bag module includes an inflator with a deployment side through which gas is expelled to fill an air bag. The inflator and bag are positioned in a canister having a deep recess. The air bag is folded in a configuration with a plurality of folded portions of the air bag stacked adjacent a side of the inflator and having perpendicularly bended portions of the folded bag in a bottom portion of the canister recess. The folded portions deploy sequentially so that only filled portions of the bag are deployed for interaction with a vehicle occupant.

14 Claims, 2 Drawing Sheets

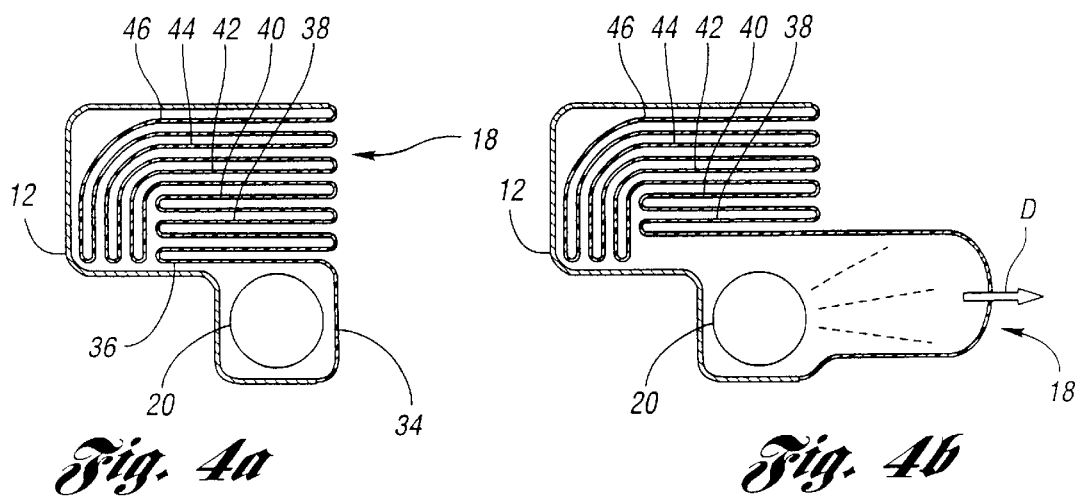
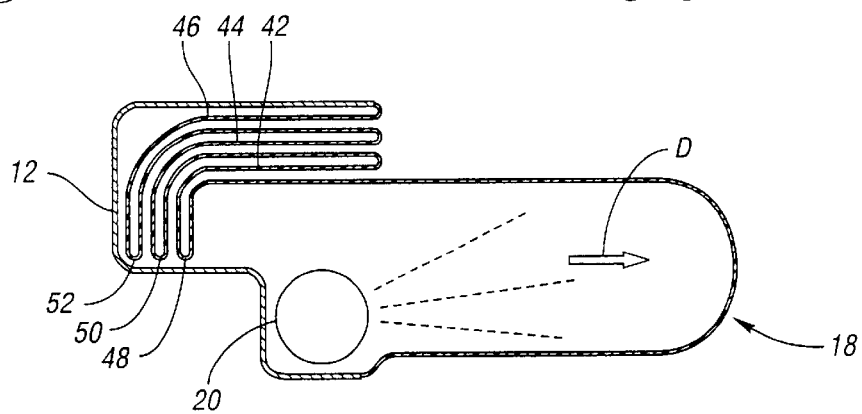
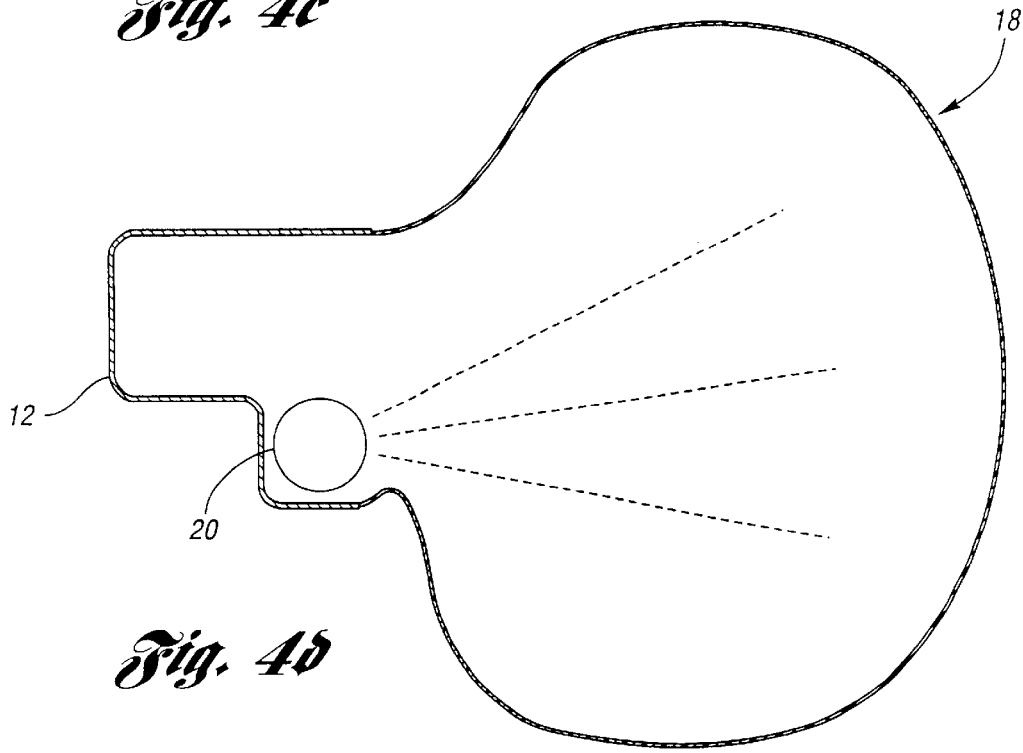

AIR BAG MODULE AND METHOD OF FOLDING AN AIR BAG

BACKGROUND OF THE INVENTION

1. Field of the Invention

The present invention relates to an air bag module and a method of folding an air bag in which the air bag is folded in a manner to deploy a series of stacked folded portions sequentially from a deep recess in a canister so that only filled portions of the air bag are allowed to interact with an occupant.

2. Background Art

It is well known that an air bag cushion is inflated with a gas when a vehicle encounters a sudden deceleration, such as in a collision. In such systems, the air bag cushion is typically housed in an uninflated and folded condition to minimize space requirements. In an emergency situation calling for deployment of the air bag cushion, inflation gas is released from an inflator to rapidly inflate and deploy the air bag cushion to interact with the vehicle occupant as the occupant moves forward within the vehicle passenger cabin. In general, such air bag cushions are designed to be inflated in less than one second.

Generally, it is desirable that an air bag cushion be stored in an out-of-the-way location until needed, and in such a manner that it can be rapidly activated to function in the desired manner. In modern vehicle designs, however, where space comes at a premium, out-of-the-way storage volumes for the storage of an air bag cushion are usually rather limited. Also, surface area is typically very limited on an instrument panel in which an air bag is stored.

It is desirable to provide a relatively large air bag and to deploy the air bag through a relatively small opening in the instrument panel to minimize usage of the fore/aft depth dimension of the air bag module as it relates to the surface area of the instrument panel from which the air bag is deployed.

Furthermore, in traditional air bag designs, the folded air bag is positioned on the deployment side of the inflator such that activation of the inflator pushes the folded air bag outward, and then the air bag fills. In this configuration, it is possible for an unfilled, folded portion of the air bag to interact with an occupant. However, it is desirable that only filled portions of the air bag be allowed to interact with the occupant.

Accordingly, it is desirable to provide an improved vehicle air bag module and method of folding an air bag that increases the potential for only filled portions of the air bag to advance toward an occupant during deployment, and in which the air bag deploys through a relatively small opening in the instrument panel from a deep recess in an air bag canister.

SUMMARY OF THE INVENTION

The present invention provides a new air bag folding concept in which packaging size of a passenger air bag module is reduced and in which the bag is folded in such a way that allows an orderly peeling away of each separate layer of the folded bag from a deep compartment of the air bag housing. By allowing the bag to peel out of the passenger air bag module housing, the potential for interaction of unfilled portions of the bag with an occupant is reduced.

More specifically, the invention provides an air bag module including an inflator having a deployment side through which gas is released in a deployment direction to fill an air bag. A canister includes a recess configured to receive the air bag in a folded condition. The recess has a deep bottom portion. The air bag includes an unfolded initial deployment portion positioned adjacent the deployment side, and a plurality of folded portions of the air bag stacked against the inflator in a direction perpendicular to the deployment direction and laying substantially flat and parallel to the deployment direction. At least one of the plurality of folded portions which are furthest from the inflator include perpendicularly bended portions which lie in the bottom portion of the canister. The folded portions are configured to deploy sequentially, starting with the folded portion nearest the inflator and ending with the folded portion furthest from the inflator, thereby helping to enable that unfilled portions of the air bag are only moved in the deployment direction as they fill with gas.

Preferably, the inflator has a deployment side, rear side, left side, and right side arranged generally in four quadrants about the periphery of the inflator. It is understood that the use of the terms "left" and "right" herein are exemplary only, and such terms may be interposed, such as would be consistent with a corresponding description of a mirror image of the drawings described herein.

In one embodiment of the invention, the plurality of folded portions include three portions laying substantially flat and three portions having the perpendicularly bended portions. Also, the perpendicularly bended portions each have a distal end such that the distal ends are aligned in a manner substantially parallel with the deployment direction. The number of airbag folds may vary within the scope of the present invention based upon volume, shape and size of the airbag.

With this invention, no folded portions of the air bag are positioned toward the deployment direction from the inflator. Accordingly, only filled portions of the bag are advanced for interaction with the occupant.

Preferably, the bottom portion of the recess is located at an end of the recess which is opposite the deployment direction, such that the recess is relatively deep opposite the deployment direction and narrow perpendicular to the deployment direction to reduce surface space consumption on the surface of an instrument panel in which the air bag module is positioned.

Another aspect of the invention provides a method of folding an air bag for positioning within a recess of a canister having a bottom portion, with an inflator positioned for deploying the air bag. The inflator has a deployment side through which gas is expelled in a deployment direction to fill the air bag. The method includes the steps of: a) providing an unfolded initial deployment portion of the air bag in a configuration for attachment to the deployment side of the inflator; b) folding and stacking a plurality of folded portions of the air bag in a configuration parallel to each other, wherein those folded portions further from the initial deployment portion are longer in length than the folded portions which are nearer the initial deployment portion; c) bending the longer folded portions so that they each form a substantially right-angle configuration with a perpendicularly bended portion extending in a direction substantially perpendicular to the parallel configuration of the folded portions; and d) positioning the air bag in the recess in a manner such that the perpendicularly bended portions lie in the bottom portion of the recess.

The method may further include attaching the inflator to the initial deployment portion and positioning the stacked plurality of folded portions flat against a side of the inflator such that the parallel configuration of folded portions is parallel to the deployment direction of the inflator.

Accordingly, an object of the present invention is to provide an improved air bag module and method of folded an air bag which allows an orderly peeling away of each separate layer of the folded air bag from a deep bag compartment of the air bag module so that only filled portions of the air bag may interact with an occupant.

The above object and other objects, features, and advantages of the present invention are readily apparent from the following detailed description of the best mode for carrying out the invention when taken in connection with the accompanying drawings.

BRIEF DESCRIPTION OF THE DRAWINGS

FIGS. 4a-4d show schematic side cross-sectional views illustrating sequential deployment of the air bag in accordance with the invention.

DETAILED DESCRIPTION OF THE PREFERRED EMBODIMENT

Figures 1, 2, 3:
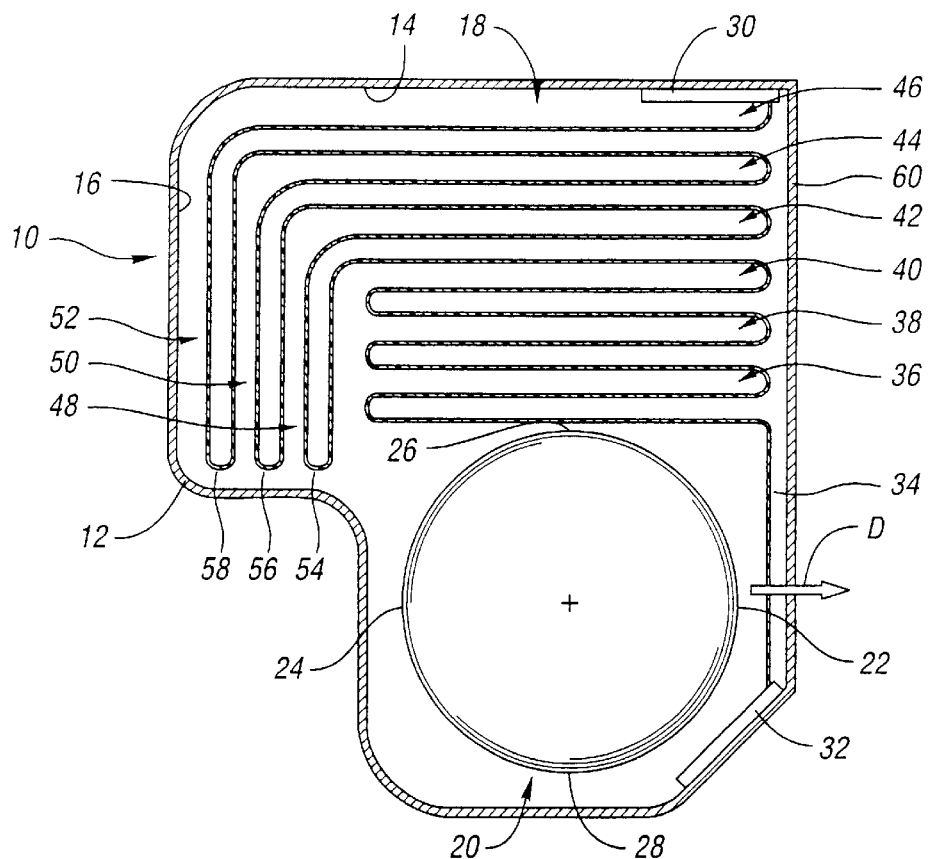
FIG. 1 shows a schematic cross-sectional view of an air bag module in accordance with the invention.
FIG. 2 shows a schematic side cross-sectional view of a first step in a bag folding process in accordance with the invention.
FIG. 3 shows a schematic side cross-sectional view of the second step of a bag folding process in accordance with the invention.

Referring to FIG. 1 a schematic side cross-sectional view is shown of an air bag module 10 in accordance with the present invention. As shown, the air bag module 10 includes a canister 12 having a recess 14 formed therein and including a deep portion 16. A folded air bag 18 is positioned within the recess 14.

An inflator 20 is also positioned within the canister 12. The inflator 20 includes a deployment side 22 through which gas is expelled in a deployment direction D to fill the air bag 18. The inflator 20 also includes a rear side 24 opposite the deployment side 22, a bag fold side 26, and a non-bag fold side 28. The deployment side 22, rear side 24, bag fold side 26, and non-bag fold side 28 are arranged generally in four quadrants about the periphery of the inflator 20. Gas is expelled only through the deployment side 22

Bag retainers 30,32 fix the air bag 18 to the canister 12. The air bag includes an unfolded initial deployment portion 34 (which is a single layer) positioned adjacent the deployment side 22, and six folded portions 36,38,40,42,44,46 are stacked against the bag fold side 26 of the inflator 20 and laying substantially flat and parallel to the deployment direction D. The folded portions 42,44,46 include perpendiculary bended portions 48,50,52, respectively, which lie in the deep portion 16 of the canister 12. The folded portions 36,38,40,42,44,46 are configured to deploy sequentially, starting with the folded portion 36 nearest the inflator 20 and ending with the folded portion 46 furthest from the inflator 20, thereby ensuring that unfilled portions of the air bag are only moved in the deployment direction D as they fill with gas.

As shown in FIG. 1, the perpendicularly bended portions 48,50,52 lie perpendicular to the deployment direction D. The bended portions 48,50,52 include distal ends 54,56,58 which are aligned in a manner substantially parallel with the deployment direction D.

The deep portion 16 of the recess 14 is located at an end of the recess which is opposite the deployment direction D, such that the recess 14 is relatively deep opposite the deployment direction and narrow in a direction perpendicular to the deployment direction. Accordingly, the front surface 60 has a minimal width, which minimizes the usage of surface area on an instrument panel in which the air bag module 10 is positioned.

As further shown in FIG. 1, no folded portions of the air bag 18 are positioned toward the deployment direction D from the inflator 20. Accordingly, during deployment, the folded, unfilled portions of the air bag are not pushed toward an occupant. Rather, only filled portions of the bag may interact with the occupant during deployment of the bag.

A method of folding the air bag 18 in accordance with the present invention is illustrated schematically in FIGS. 2 and 3. As shown, the unfolded initial deployment portion 34 of the air bag 18 is positioned in a configuration for attachment to the deployment side of the inflator. The plurality of folded portions 36,38,40,42,44,46 are folded and stacked in a configuration parallel to each other, wherein those folded portions 42,44,46 which are further from the initial deployment portion 34 are longer in length than the folded portions 36,38,40 which are nearer the initial deployment portion 34. The longer folded portions 42,44,46 are then bent so that they each form a substantially right-angle configuration with the perpendicularly bended portions 48,50,52 extending in a direction substantially perpendicular to the parallel configuration of the folded portions 36,38,40,42,44,46. After the step illustrated in FIG. 3, the air bag 18 is positioned within the canister 12 relative to the inflator 20 such that the unfolded initial deployment portion 34 is adjacent the deployment side 22 of the inflator 20, and the perpendicularly bended portions 48,50,52 of the air bag are positioned within the deep portion 16 of the recess 14.

FIGS. 4a-4d schematically illustrate the deployment of the air bag 18 from the canister 12 as gas is deployed from the inflator 20. As shown in FIGS. 4a-4b, as the inflator 20 initially discharges gas, the unfolded initial deployment portion 34 and the folded portion 36 are first to deploy. As these portions deploy, the remaining folded portions 38,40, 42,44,46 remain in the canister. Between the stages illustrated in FIGS. 4b-4c, the folded portions 38 and 40 are filled with gas and deployed in the deployment direction D. Inertia from the weight of the perpendicularly bended portions 48,50,52 maintains the folded portions 42,44,46 within the canister 12 as the folded portions 36,38,40 are deployed. After the deployment stage illustrated in FIG. 4c, the folded portions 42,44,46 deploy sequentially until the air bag is completely deployed as shown in FIG. 4d.

The air bag could be folded before or after its attachment to the canister 12 and/or a cushion retainer device, as desired.

In this manner, only gas filled portions of the air bag are moved in the deployment direction D for interaction with a vehicle occupant. The folded portions remain within the canister 12 until they are sequentially filled with gas and deployed.

While the best mode for carrying out the invention has been described in detail, those familiar with the art to which this invention relates will recognize various alternative designs and embodiments for practicing the invention within the scope of the appended claims.

What is claimed is:

1. A method of folding an air bag for positioning within a canister having a deep portioned recess, with an inflator positioned for deploying the air bag, said inflator having a deployment side through which gas is expelled in a deployment direction to fill the air bag, the method comprising:

providing an unfolded initial deployment portion of the air bag in a configuration adjacent the deployment side of the inflator;

folding and stacking a plurality of folded portions of the air bag in a configuration parallel to each other, wherein those folded portions further from the initial deployment portion are longer in length than the folded portions which are nearer the initial deployment portion;

bending said longer folded portions so that they each form a substantially right-angle configuration with a perpendicularly bended portion extending in a direction substantially perpendicular to said parallel configuration of the folded portions; and positioning the air bag in the canister in a manner such that the perpendicularly bended portions lie in the deep portioned recess.

2. The method of claim 1, further comprising attaching the initial deployment portion to the canister and positioning said stacked plurality of folded portions flat adjacent a side of the inflator such that said parallel configuration of folded portions is parallel to the deployment direction of the inflator.

3. The method of claim 1, wherein said deployment side and a rear side, a bag fold side and a non-bag fold side are arranged generally in four quadrants about the periphery of the inflator.

4. The method of claim 1, wherein said plurality of folded portions include three portions laying substantially flat and three portions having said perpendicularly bended portions.

5. The method of claim 1, further comprising forming said perpendicularly bended portions to each include a distal end, and aligning the distal ends substantially parallel with the deployment direction.

6. The method of claim 1, further comprising positioning the air bag relative to the inflator such that no folded portions of the air bag are positioned toward the deployment direction from the inflator.

7. The method of claim 1, wherein an end of the deep portioned recess is located opposite the deployment direction, and a height of the canister from a deployment end to the end of the recess is greater than a width of the deep portioned recess of the canister.

8. An air bag module comprising:

an inflator having a deployment side through which gas is expelled in a deployment direction to fill an air bag, a rear side opposite the deployment side, a bag fold side and a non-bag fold side;

a canister having a recess configured to receive the air bag in a folded condition, said recess having a deep portion;

said air bag including an unfolded initial deployment portion positioned adjacent the deployment side, and a plurality of folded portions of the air bag stacked adjacent the bag fold side of the inflator and laying substantially flat and parallel to the deployment direction, wherein at least two of said plurality of folded portions which are furthest from the inflator include perpendicularly bended portions which lie in the deep portion of the canister; and said folded portions being configured to deploy sequentially, starting with the folded portion nearest the inflator and ending with the folded portion furthest from the inflator, thereby ensuring that unfilled portions of the air bag are only moved in the deployment direction as they fill with gas.

9. The air bag module of claim 8, wherein said deployment side, rear side, bag fold side and non-bag fold side are arranged generally in four quadrants about the periphery of the inflator.

10. The air bag module of claim 8, wherein said plurality of folded portions include three portions laying substantially flat and three portions having said perpendicularly bended portions.

11. The air bag module of claim 8, wherein said perpendicularly bended portions each have a distal end, said distal ends being aligned in a manner substantially parallel with the deployment direction.

12. The air bag module of claim 8, wherein no folded portions of the air bag are positioned in the path of the deployment direction from the inflator.

13. The air bag module of claim 8, wherein said deep portion of the recess is located at an end of the recess which is opposite the deployment direction, and a height of the canister from a deployment end to the end of the recess is greater than a width of the deep portion of the canister.

14. An air bag module comprising:

an inflator having a deployment side through which gas is expelled in a deployment direction to fill an air bag, a rear side opposite the deployment side, a bag-fold side and a non-bag fold side;

a canister having a recess configured to receive the air bag in a folded condition, said recess having a deep portion;

said air bag including an unfolded initial deployment portion positioned adjacent the deployment side, and a plurality of folded portions of the air bag stacked adjacent the inflator in a direction perpendicular to the deployment direction and laying substantially flat and parallel to the deployment direction, wherein at least two of said plurality of folded portions which are furthest from the inflator include perpendicularly bended portions which lie in the deep portion of the canister; and wherein no folded portions of the air bag are positioned toward the deployment direction from the inflator so that the folded portions will deploy sequentially, starting with the folded portion nearest the inflator and ending with the folded portion furthest from the inflator, thereby ensuring that unfilled portions of the air bag are only moved in the deployment direction as they fill with gas.

* * * * *